Figure 1:
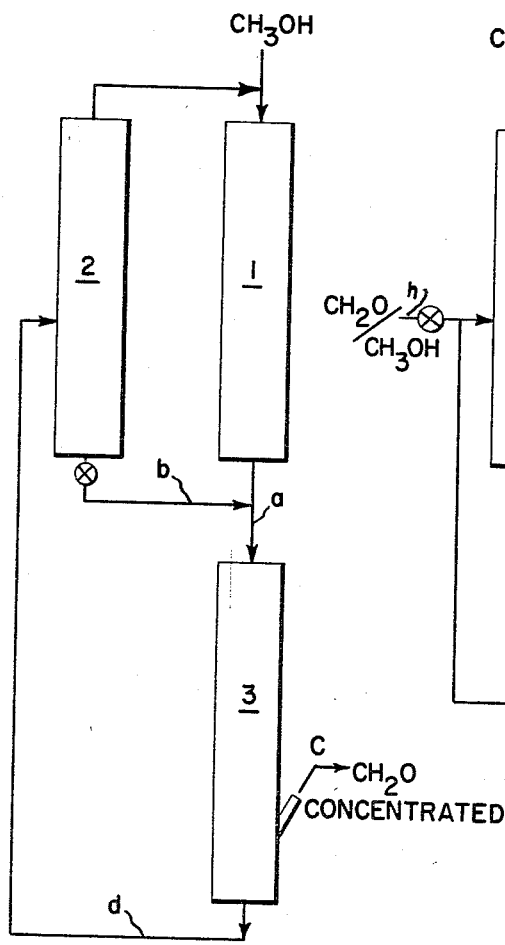

May 23, 1967  J. O. PUNDERSON ET AL  3,321,527
PREPARATION OF CONCENTRATED FORMALDEHYDE
Filed May 16, 1960

INVENTORS
JOHN OLIVER PUNDERSON
CARL EARLE SCHWEITZER

BY

ATTORNEY

United States Patent Office 3,321,527
Patented May 23, 1967

3,321,527
PREPARATION OF CONCENTRATED
FORMALDEHYDE
John Oliver Punderson and Carl Earle Schweitzer, Wilmington, Del., assignors to E. I. du Pont de Nemours and Company, Wilmington, Del., a corporation of Delaware
Filed May 16, 1960, Ser. No. 29,235
3 Claims. (Cl. 260—603)

This invention relates to concentrating formaldehyde and more particularly relates to the preparation of concentrated formaldehyde by the partial condensation of vapor compositions containing formaldehyde and methanol.

Commercially, formaldehyde is generally made by the air oxidation of methanol which gives a product containing mainly formaldehyde and water together with only minor amounts of unreacted methanol. Processes are known for removing water from such products and thus recovering a more highly concentrated formaldehyde. Little attention has been given, however, to processes for recovering concentrated formaldehyde from mixtures containing mainly formaldehyde and methanol with little or no water present. Such mixtures are potentially available as products resulting from catalytic dehydrogenation of methanol. The catalytic dehydrogenation process has not been used for making formaldehyde commercially, and, indeed, there is no indication from prior art studies that methanol has, prior to the filing of copending application Ser. No. 641,837, of J. O. Punderson, on Feb. 25, 1957, and now U.S. Patent No. 2,939,883, been catalytically dehydrogenated to formaldehyde from which the aldehyde has been prepared in high conversions. Dehydrogenation processes of methanol to formaldehyde should neither be confused with the air oxidation of methanol to formaldehyde containing reaction products, in which air or fortified oxygen is reacted with methanol, nor with the composite processes in which a substantial amount of air oxidation occurs simultaneously with dehydrogenation.

The air oxidation process has been considered by theorists to involve possibly two steps—one of oxidation and one of dehydrogenation, the steps occurring successively. The overall methanol oxidation reactions take place in accord with this reaction:

$$2CH_3OH + O_2 \rightarrow 2CH_2O + 2H_2O$$

It will be noted that in the product of this invention the formaldehyde to water ratio is 1:1. The only methanol in the product would be that unoxidized during the reaction.

The primary reactions occurring in the methanol dehydrogenation system are quite different, viz., (1) $CH_3OH \rightleftharpoons CH_2O + H_2$ (main reaction)

(2) $CH_2O \rightarrow CO + H_2$ (side reaction)

The product of dehydrogenation, after normal condensation, is primarily formaldehyde in the presence of some unreacted methanol and in the substantial absence of water.

The prior art processes for the concentration of formaldehyde primarily relate to the treatment of aqueous solutions obtained from the air oxidation of methanol. Methanol solutions of formaldehyde as a source of producing concentrated formaldehyde have heretofore been of minor commercial importance. In research work precursing the present invention, it was found that almost pure methanol could be distilled out of methanol-formaldehyde mixtures at one atmosphere pressure until the composition remaining in the stillpot mixture was about 65% formaldehyde. Increasing difficulty was encountered, however, in making an effective separation when further concentration of the formaldehyde was attempted. Larger amounts of formaldehyde tended to distill overhead with the methanol, and the methanol recovery system became fouled with formaldehyde polymer. The invention provides an improved method of economically preparing concentrated formaldehyde from methanol solutions thereof and of accomplishing this with a minimum of polymer formation.

Objects of the invention are: to provide a process for the concentration of formaldehyde from the reaction products of methanol catalytic dehydrogenation processes or from methanol solutions of formaldehyde from any source; to provide formaldehyde of better than 70% concentration; to concentrate formaldehyde in methanol by partial condensation; and to prepare concentrated formaldehyde from methanol solutions thereof, preferably anhydrous, by partial condensation and separation of the liquid condensate from the concentrated formaldehyde. Other objects and advantages of the invention will hereinafter appear.

The invention in its broader aspects constitutes a process for the concentration of formaldehyde to at least 70%, preferably to above 90% and, if desired, to better than 98% (in weight percent), by the partial condensation of mixtures of methanol and formaldehyde obtained from any source and especially from the reaction mixture obtained by the catalytic dehydrogenation of methanol and like mixtures containing methanol and formaldehyde, the mixture prior to concentration being preferably substantially anhydrous, although small amounts of water may be present.

The aforesaid formaldehyde-methanol starting material may be available as a vapor mixture or may be readily converted to vapor form by heating. The vapor mixture is passed into a condenser which is adapted and arranged to condense out a liquid mixture containing formaldehyde and methanol having a weight percent of between 40% and about 65% of formaldehyde. The vapor from the condenser is recovered and is more concentrated in formaldehyde than the starting material. The concentration may be greater than 98% formaldehyde, or at least as rich in formaldehyde as desired, the richness being controlled by the operating conditions and the physical dimensions of the condenser.

When operating in accord with the invention, the starting methanol-formaldehyde mixture is fed into a partial condenser as a vapor containing from about 60% to about 90% and preferably from about 65% to about 75% of formaldehyde by weight related to the total $CH_2O/CH_3OH$ present in the stream. The condensate from the partial condenser contains from about 40% to about 65% and preferably from about 45% to about 60% of formaldehyde in $CH_2O/CH_3OH$.

The concentrations of formaldehyde in $CH_2O/CH_3OH$ refer to compositions analytically measured and expressed as weight percent of total formaldehyde and not with reference to the chemical state of the mixture. For convenience, this convention is used throughout the specification and claims. Chemically, a 1:1 molar mixture of formaldehyde and methanol in the liquid phase is believed to be a mixture of methanol, methyl hemiformal, and various soluble higher adducts of methanol and formaldehyde having the general formula $$CH_3O(CH_2O)_nH$$

together with a small amount of free formaldehyde (n being an integer of 1 or higher). In the vapor phase a 1:1 molar mixture of formaldehyde and methanol is believed to consist largely of methanol, free formaldehyde, and methyl hemiformal.

Figure 2:
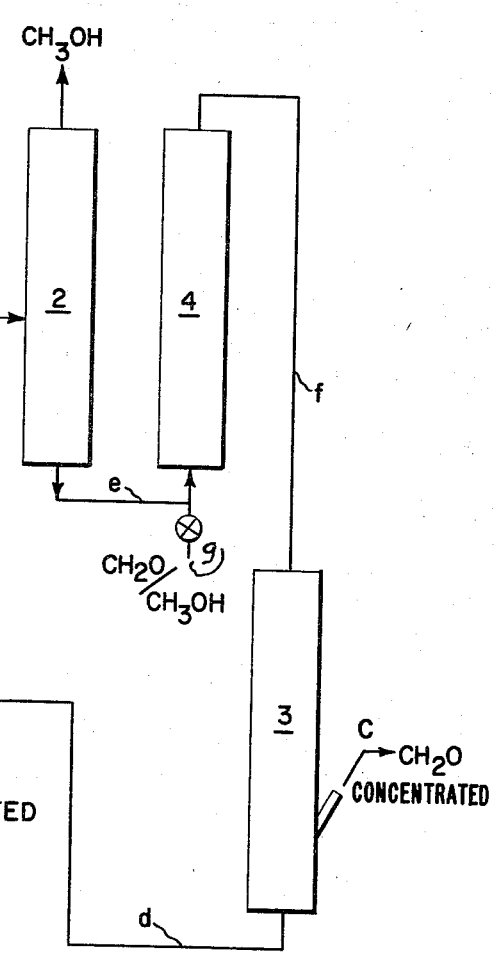

Alternate features of the invention are illustrated diagrammatically by the FIGURES 1 and 2 of the drawing which show operating cycles used for obtaining concentrated formaldehyde. In accord with these features, the processes include combinations of three operations—(W) dehydrogenation; (X) distillation; (Y) quenching; and (Z) partial condensation. It is understood that operations (W), (X) and (Y) may be replaced by any system capable of producing vapors of a partially concentrated solution of formaldehyde in methanol or essentially water-free formaldehyde vapors of high methanol concentration from any source.

FIGURE 1 illustrates a distillation apparatus including a catalytic dehydrogenation reactor 1, a distillation column 2 and a partial condenser 3.

The process, in accord with one feature of the invention, is initiated by passing methanol into the catalytic dehydrogenation reactor 1 and through an 8–20 mesh shot catalyst of an alloy consisting of 97.8% silver, 2.0% copper and 0.2% silicon by weight therein. The dehydrogenation is conducted at a temperature of about 650° C. (See the copending application of J. O. Punderson, Ser. No. 641,837, filed Feb. 25, 1957.) A 70% conversion of methanol to formaldehyde is obtained and discharged through line $a$.

To the hot, vapor phase effluent of the catalytic reactor in line $a$, there is added a liquid $CH_2O/CH_3OH$ stream from the distillation column 2, particularized below, through line $b$. Combination of these two streams results in rapid vaporization of the liquid stream from column 2 which helps to quench the catalytic reactor effluent vapors to a lower temperature, thereby minimizing side-reactions in the hot vapor stream and substantially reducing the heat load on the partial condenser. The resulting vapor mixture is passed into the partial condenser 3 which is operated at a temperature of about 0° C. The gas withdrawn through line $c$ from the condenser 3, has a concentration of 98.0% by weight of formaldehyde related to the total $CH_2O/CH_3OH$ in the stream, and a $CH_2O/CH_3OH$ liquid condensate of about 52% by weight of formaldehyde is discharged through line $d$ from the partial condenser.

The aforesaid 52% formaldehyde liquid condensate in line $d$ is sent to the distillation column 2 in which methanol is removed overhead and a $CH_2O/CH_3OH$ mixture of about 65% formaldehyde is discharged as tails to line $b$. It will be apparent to those skilled in the art of distillation that this column can be operated at any suitable combination of pressure and temperature. It has been found very convenient, however, to operate the column at a pressure of about 1 atmosphere, in which case the methanol comes overhead at about 65° C. and the tails stream is normally obtained at approximately 110° C. It is also apparent that the distillation apparatus may include a condenser for the methanol stream taken overhead, although this is not shown in the drawing. The recovered methanol is returned to the catalytic reactor 1 and the 65% formaldehyde mixture in line $b$ is combined with the substantially anhydrous formaldehyde mixture from the catalysis as described, and the cycle of operations repeated.

Alternatively, the process of the invention is conducted without being integrated with a catalytic dehydrogenation reactor. A $CH_2O/CH_3OH$ mixture from any suitable source and preferably having a concentration of between 60 and 90% formaldehyde is admitted to the system through line $g$, FIGURE 2, vaporized in the vaporizer 4, passed through line $f$ and into partial condenser 3. The partial condenser and distillation column are operated as described above giving a concentrated formaldehyde product from line $c$. Methanol is recovered from the top of the distillation column, and the stream from the bottom of the column is conducted to the vaporizer through line $e$. As a further alternative, the valve in line $g$, FIGURE 2, is closed and a $CH_2O/CH_3OH$ mixture from any suitable source and preferably having a concentration of between approximately 5 and 65% formaldehyde is admitted to the system through the line $h$. This stream is combined with the condensate in line $d$ and the mixture fed to the distillation column, the rest of the system functioning as described above.

The distillation and vaporization steps described may alternatively be conducted as batch processes. A preferred embodiment of this is illustrated by the following example:

*Example.*—A dilute solution of formaldehyde in methanol is distilled at atmospheric pressure in a 43-inch distillation column taking methanol overhead until the concentration of formaldehyde in the stillpot reaches 66.9%. Toward the end of this distillation appreciable amounts of formaldehyde distill overhead with the methanol, thus illustrating the difficulty of further concentrating formaldehyde-methanol mixtures by simple distillation. The product in the stillpot consisting of 313.3 grams of a methanol-formaldehyde mixture containing 66.9% formaldehyde by analysis is then charged into a round-bottomed flask provided with a heating mantle and attached by a vapor line to a water-cooled condenser, which is held in a vertical position and connected at the bottom to a liquid-gas separator. The mixture in the flask is heated and the flow of cooling water, at about 10° C., started through the condenser as soon as the walls of the condenser are wet with condensate. During a period of 80 minutes, 284 g. of the starting material is volatilized, and the formaldehyde gas and liquid $CH_2O/CH_3OH$ condensate are collected and analyzed.

Seven cuts of the liquid condensate are taken and have these analyses of formaldehyde in weight percent: #1, 45.8; #2, 49.5; #3, 49.9; #4, 51.3; #5, 52.0; #6, 52.2; and #7, 56.9. The concentrated formaldehyde gas separated from the condenser has a concentration of greater than 93.7% formaldehyde throughout the run.

The concentration of formaldehyde in the product is controlled by the physical dimensions and operating conditions of the partial condenser. Use of a larger condenser or use of a lower temperature for the cooling liquid circulated to the condenser normally affects the process in the following ways: (1) the concentration of formaldehyde in the product is increased; (2) the concentration of formaldehyde in the liquid condensate stream is increased; and (3) the amount of gaseous formaldehyde obtained as product is decreased compared to the amount of formaldehyde which is recycled to the process in the condensate stream. Cooling liquid temperatures which are used for the partial condenser normally are within the range of about −20° C. to about 50° C. and preferably between about −10° C. and 20° C.

The concentrated formaldehyde of better than 98% produced by the process of the invention, is especially adapted, for example, to conversion into polyoxymethylenes for use in the plastic industry, and the formaldehyde product of lower concentrations is particularly useful as a reactant in many organic processes in which the presence of water is disadvantageous. The concentrated formaldehyde can also be used in methanol-tolerant processes of the art.

We claim:
1. A process for producing concentrated formaldehyde which comprises
   (1) vaporizing a mixture containing formaldehyde and methanol which is at least 60% by weight formaldehyde,
   (2) partially condensing said vaporous formaldehyde mixture to form a liquid formaldehyde solution which is less concentrated with respect to the percent by weight of formaldehyde than the resulting uncondensed formaldehyde vapors,
   (3) recovering uncondensed formaldehyde,
   (4) separating methanol from the liquid condensate to increase the amount of formaldehyde on a percentage weight basis present in the liquid,
   (5) recycling the liquid through the vaporizing and condensing steps, and

(6) separating uncondensed formaldehyde.

2. A process of producing concentrated formaldehyde which comprises
   (1) forming a formaldehyde, methanol mixture containing at least 60% formaldehyde,
   (2) vaporizing the mixture,
   (3) partially condensing said vaporous formaldehyde mixture to form a liquid formaldehyde solution which is less concentrated with respect to the percent by weight of formaldehyde than the resulting uncondensed formaldehyde vapors,
   (4) recovering uncondensed formaldehyde, and
   (5) recycling the liquid formaldehyde solution to the step of forming a mixture.

3. A process for the production of concentrated formaldehyde, which comprises
   (1) catalytically dehydrogenating methanol to give a vaporous mixture containing formaldehyde and methanol, which is at least 60% by weight formaldehyde based on the total weight of methanol and formaldehyde present,
   (2) partially condensing said vaporous formaldehyde mixture to form a liquid formaldehyde solution which is less concentrated with respect to the percent by weight of formaldehyde than the resulting uncondensed formaldehyde vapors,
   (3) recovering uncondensed formaldehyde,
   (4) separating methanol from the liquid to increase the amount of formaldehyde on a percentage weight basis present in the liquid, and
   (5) vaporizing the thus treated liquid by introducing it into the vaporous mixture obtained from the catalytic dehydrogenation.

References Cited by the Examiner

UNITED STATES PATENTS

| | | | |
|---|---|---|---|
| 2,111,584 | 3/1938 | Eversole | 260—603 |
| 2,953,602 | 9/1960 | Aries | 260—603 |

BERNARD HELFIN, *Acting Primary Examiner.*

CHARLES B. PARKER, *Examiner.*

J. J. STETELIK, *Assistant Examiner.*